United States Patent [19]

Okuda et al.

[11] Patent Number: 4,495,164

[45] Date of Patent: Jan. 22, 1985

[54] PROCESS FOR PRODUCING ACICULAR MAGNETITE OR ACICULAR MAGHEMITE

[75] Inventors: Yosiro Okuda; Tosiharu Harada, both of Hiroshima, Japan

[73] Assignee: Toda Kogyo Corp., Hiroshima, Japan

[21] Appl. No.: 512,661

[22] Filed: Jul. 11, 1983

Related U.S. Application Data

[63] Continuation-in-part of Ser. No. 265,015, May 19, 1981, abandoned.

[30] Foreign Application Priority Data

May 30, 1980 [JP] Japan .................................. 55-73512
May 31, 1980 [JP] Japan .................................. 55-73511

[51] Int. Cl.$^3$ ....................... C01G 49/06; C01G 49/08
[52] U.S. Cl. .................................. 423/266; 252/62.64; 423/632; 423/633; 423/634
[58] Field of Search .......................... 252/62.56, 62.64; 423/632, 633, 634, 266

[56] References Cited

U.S. PATENT DOCUMENTS 3,928,709  12/1975  Audran et al. .................. 423/633 X

FOREIGN PATENT DOCUMENTS 2455158   5/1975  Fed. Rep. of Germany ...... 423/633
56-169132 12/1981  Japan .

OTHER PUBLICATIONS

Sakomoto et al., "Journal of the Japan Society of Powder and Powder Metallurgy", 1974, pp. 108–109.

*Primary Examiner*—Jack Cooper
*Attorney, Agent, or Firm*—Wegner & Bretschneider

[57] ABSTRACT

A process for producing acicular magnetite or maghemite of high axial ratio, which comprises
preparing an iron (II) hydroxide suspension at a pH of at least 11 with a magnesium sulfate or magnesium chloride in an amount of 0.5 to 7.0 atomic % based on the amount of the iron (II) hydroxide in the suspension and calculated as the ratio of Mg to Fe (II),
oxidizing the resultant suspension with the oxygen-containing gas to form an acicular iron (III) oxide hydroxide in the form of particles having a long axis length of 0.3 to 2.0 μm and an axial ratio of more than 20:1,
reducing said acicular iron (III) oxide hydroxide into the acicular magnetite, and oxidizing the resultant acicular magnetite to form the acicular maghemite, if necessary.

3 Claims, 8 Drawing Figures

X 20000

X 20000

X20000

X20000

X 20000

X 20000

PROCESS FOR PRODUCING ACICULAR MAGNETITE OR ACICULAR MAGHEMITE

CROSS-REFERENCE TO RELATED APPLICATION

This application is a continuation-in-part of the U.S. patent application No. 265015 filed May 19, 1981, now abandoned.

SUMMARY OF THE INVENTION

In aspect of the present invention, there is provided a process for producing acicular magnetite or acicular maghemite of high axial ratio, which comprises preparing an iron (II) hydroxide suspension contains sodium hydroxide and magnesium sulfate or magnesium chloride in an amount of 0.5 to 7.0 atom % based on the amount of the iron (II) hydroxide in the suspension and calculated as the ratio of Mg to Fe (II), oxidizing the resultant suspension with an oxygen-containing gas to form an acicular iron (III) oxide hydroxide in the form of particles having a long axis length of 0.3 to 2.0 μm and an axial ratio of more than 20:1, reducing said acicular iron (III) oxide hydroxide into the acicular magnetite, and oxidizing the resultant acicular magnetite to form the acicular maghemite, if necessary.

In second aspect of the present invention, there is provided an acicular magnetite or acicular maghemite of high axial ratio obtained by preparing an iron (II) hydroxide suspension at a pH of at least 11, which suspension contains sodium hydroxide and magnesium salfate or magnesium chloride in an amount of 0.5 to 7.0- atom % based on the amount of the iron (II) hydroxide in the suspension and calculated as the ratio of Mg to Fe (II), oxidizing the resultant suspension with an oxygen-containing gas to form an acicular iron (III) oxide hydroxide being in the form of particles having a long axis length of 0.3 to 2.0 μm and an axial ratio of more than 20:1, reducing said acicular iron (III) oxide hydroxide into the acicular magnetite, and oxidizing the resultant acicular magnetite to form the acicular maghemite, if necessary.

BACKGROUND OF THE INVENTION

This invention relates to a process for producing acicular magnetite or acicular maghemite of favorable particle properties, especially high long axis-to-short axis ratio and magnetic characteristics suitable for use in magnetic recording medium.

In recent years, a demand for a high quality of magnetic recording media including magnetic tape, magnetic disc and the like has been more and more increasing with the progress of miniaturization and weight saving of reproducing apparatus for magnetic recording. To be specific, magnetic recording media of higher bit density, higher output, higher sensitivity and improved frequency characteristic et al, has been requested.

The magnetic material should have a high coercive force Hc and a large saturation magnetization $\sigma_s$ suitable for satisfying the requests for the magnetic recording media. Further, these magnetic properties of magnetic recording media are mainly influenced by their residual magnetic flux density Br, while the residual magnetic flux density Br is strongly influenced by properties of the magnetic powder such as their dispersiveness in vehicle, their orientation and packing property in a coating medium.

Iron oxide needles such as acicular magnetite powder and acicular maghemite powder used as a main magnetic recording material is usually prepared in such a manner that acicular α-FeO (OH) is reduced in a stream of reducing gas such as $H_2$, at a temperature of 300° to 400° C. to produce acicular magnetite powder, or thereafter the produced acicular magnetite powder is re-oxidized at a temperature of 200° to 300° C. in the air to produce acicular maghemite powder. The iron oxide needles obtained in this way have good magnetic properties, that is, relatively high coercive force Hc and relatively high rectangular Br/Bm ratio, nevertheless these magnetic properties are still unsatisfactory. Therefore many efforts have been made to improve the magnetic properties of acicular iron oxide particles.

It is known that such magnetic properties correlate largely to the shape and size of the starting acicular α-FeO(OH) particles. The shape and size, especially long axis-to-short axis ratio (hereinafter referred to as simply "axial ratio") of the particles which determine the magnetic properties including coercive force (Hc), saturation magnetization ($\sigma_s$) et al. must be adjusted in the α-FeO(OH) itself.

The starting acicular α-FeO(OH) is prepared by, as a typical manner, adding more than equivalent of alkaline aqueous solution to an aqueous solution of ferrous salt to produce an aqueous suspension containing precipitated $Fe(OH)_2$, and thereafter oxidizing the obtained suspension at a pH of more than 11 and at a temperature of less than 80° C. The acicular α-FeO(OH) thus obtained is in a form of needles having a length of long axis of about 0.5-1.5 μm while the axial ratio is even up to about 10:1, and further their particles can not be said to have sufficient axial ratio. Moreover, the conversion of α-FeO(OH) into magnetic iron oxide has a considerable influence in changing the axial ratio and so the axial ratio of final product gets to be at most about 6:1.

One method for producing α-FeO(OH) particles with higher axial ratio is the addition of certain ion of foreign metal other than Fe into an aqueous solution of ferrous salt. The foreign metal is, for example, Co, Ni, Cr, Mn, Cd and facilitates to grow the particles in the direction of their long axis. However, this addition leads to the ultramicronization of particles. Unfortunately the ultramicronization is more conspicuous with the increase of the added amount of foreign metal. The thus-ultramicronized α-FeO(OH) particles are not suitable as a starting material for producing magnetic powder.

The another method is the addition of magnesium sulfate in an amount of 0.2 to 2% by weight based on the amount of the ferrous salt to the ferrous salt suspension at a pH of 7 to 11 in the presence of alkali carbonate. However, this method aims to obtain the α-FeO(OH) particles in a spindle-like shape, and in fact the particles obtained by this method have a spindle-like shape with a minute diameter. Besides this method also leads to the micronization of the particles. Therefore the ferromagnetic iron oxide particles produced from the thus-obtained α-FeO(OH) particles cannot be said to have sufficient magnetic properties.

Accordingly, an object of this invention is to provide a process for preparing acicular magnetite or acicular maghemite particles having high axial ratio.

Another object of this invention is to provide a process for preparing acicular magnetite particles or acicular maghemite without ultramicronization and suitable for use in magnetic recording medium.

These and other objects of this invention will become more apparent from the following description.

The foregoing and other objects of this invention will be accomplished by the process of this invention in which the formation of acicular α-FeO(OH) having high axial ratio as starting material is carried out by previously providing an iron (II) hydroxide (Fe(OH)$_2$) suspension at a pH of at least 11 with a magnesium sulfate or magnesium chloride and thereafter oxidizing the iron (II) hydroxide suspension with an oxygen-containing gas.

BRIEF DESCRIPTION OF THE DRAWINGS

FIGS. 3 and 4 show acicular α-FeO(OH) particles prepared in Example 2 and Comparative Example 1, respectively.

FIGS. 5 and 6 show acicular magnetite particles prepared in Example 10 and Comparative Example 2, respectively.

FIGS. 7 and 8 show acicular maghemite particles prepared in Example 18 and Comparative Example 3, respectively.

DETAILED DESCRIPTION OF THE INVENTION

In accordance with one feature of the present invention, magnesium sulfate or magnesium chloride added to the Fe(OH)$_2$ suspension is found to exhibit a characteristic action to produce an acicular α-FeO(OH) nuclei with high axial ratio in the first generation step and further to suppress the growth of the α-FeO(OH) nuclei in the direction of their short axis and to facilitate the growth in the direction of their long axis during the second growth step, thereby the acicular α-FeO(OH) particles with higher axial ratio are obtained. The mechanism of magnesium sulfate or magnesium chloride in the characteristic action is not clear, but perhaps one reason lies in that the added magnesium ion is easily adsorbed on the surface parallel to the long axis compared with the surface perpendicular to the long axis of particle. Further, surprisingly it has been found as the result of the structure analysis of α-FeO(OH) after adding magnesium salt that α-FeO(OH) particles maintain their original shape and the magnesium ions are deposited thereon. This fact indicates that α-FeO(OH) does not react with the magnesium sulfate or magnesium chloride, whereas in the prior art α-FeO(OH) reacts with certain foreign metal to change other crystalline structure. In other words this invention depends on shape and size magnetic anisotropy, whereas the conventional methods depend on crystal magnetic anisotropy.

The conditions and effects of the addition of the magnesium sulfate or magnesium chloride will be detailed hereinafter based on the results of many experiments performed by the inventors of the present invention. Referring now to the attached drawings, the effects provided by the addition of the magnesium sulfate or magnesium chloride according to the present invention will be described in detail hereinafter.

Figure 1:
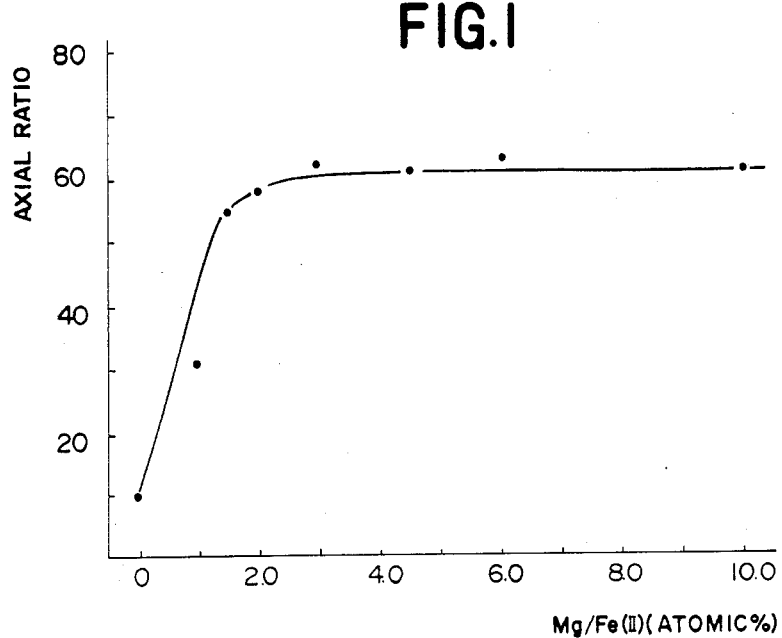
FIG. 1 illustrates the relation between the added amount of magnesium sulfate salt and the axial ratio of acicular α-FeO(OH) particles.

FIG. 1 shows the relationship between the axial ratio (long axis:short axis) of the acicular α-FeO(OH) particle and the amount of the magnesium sulfate or magnesium chloride contained in a Fe(OH)$_2$ suspension at a pH of 13 which is prepared by mixing 1.0 mol/l of an aqueous ferrous sulfate solution with MgSO$_4$ of 0.1–10.0 atomic % calculated as the ratio of Mg to entire Fe(II) (hereinafter referred to as simply "Mg/Fe(II)") and thereafter adding an aqueous NaOH solution. The resultant Fe(OH)$_2$ suspension is then oxidized by introducing 100 l of air per minute at a temperature of 45° C. thereinto to form the acicular α-FeO(OH) particles.

As is apparent from FIG. 1, the axial ratio is inclined to be raised with the increase of the added amount of the magnesium sulfate or magnesium chloride.

Figure 2:
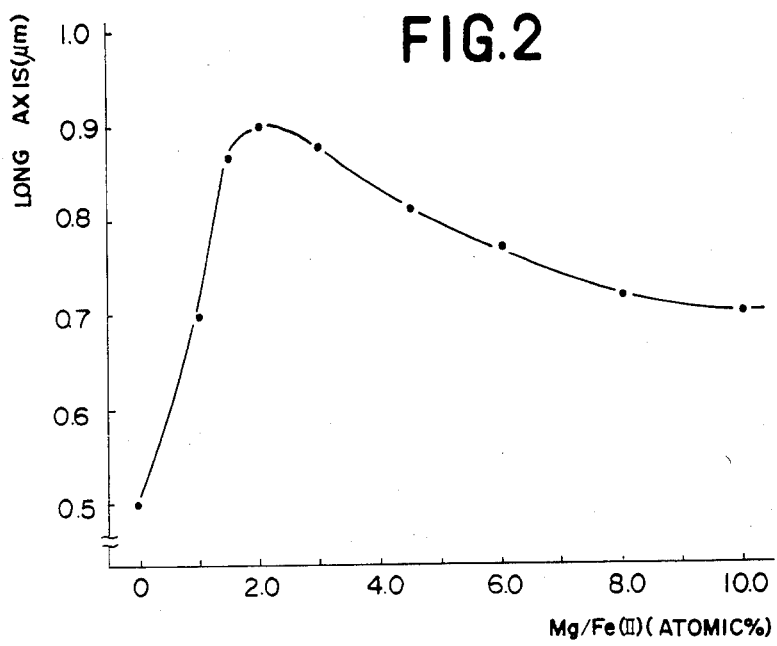
FIG. 2 illustrates the relation between the added amount of magnesium sulfate and the long axis of acicular α-FeO(OH) particles.

FIG. 2 shows the relationship between the added amount of the magnesium sulfate or magnesium chloride and the length of long axis of the acicular α-FeO(OH) particles produced under the same conditions as described in regard to FIG. 1.

As seen from FIG. 2, the acicular α-FeO(OH) particles are inclined to grow in the direction of their long axis with the increase of the added amount of the magnesium sulfate or magnesium chloride in the range of 0 to 2.0 atomic % calculated as Mg/Fe(II). FIG. 2 shows that if the magnesium sulfate or magnesium chloride is added to the Fe(II) aqueous solution in an amount exceeding 2.0 atomic % calculated as Mg/Fe(II), the length of long axis is inclined to be lowered with the increase of the added amount of Mg. This is because the growth of the particles in the direction of their long axis may be suppressed due to the absorption of magnesium ions on the surface perpendicular to their long axis with the increase of the added amount of the magnesium sulfate or magnesium chloride. However, simultaneously, magnesium ions are absorbed on the surface parallel to the long axis of the α-FeO(OH) particles and so the growth in the direction of their short axis is more and more suppressed. Accordingly, the axial ratio of particle itself is not lowered as shown in FIG. 1 when the magnesium sulfate or magnesium chloride is contained in Fe(OH)$_2$ suspension in an amount exceeding 2.0 atomic % calculated as Mg/Fe(II).

Figure 3:
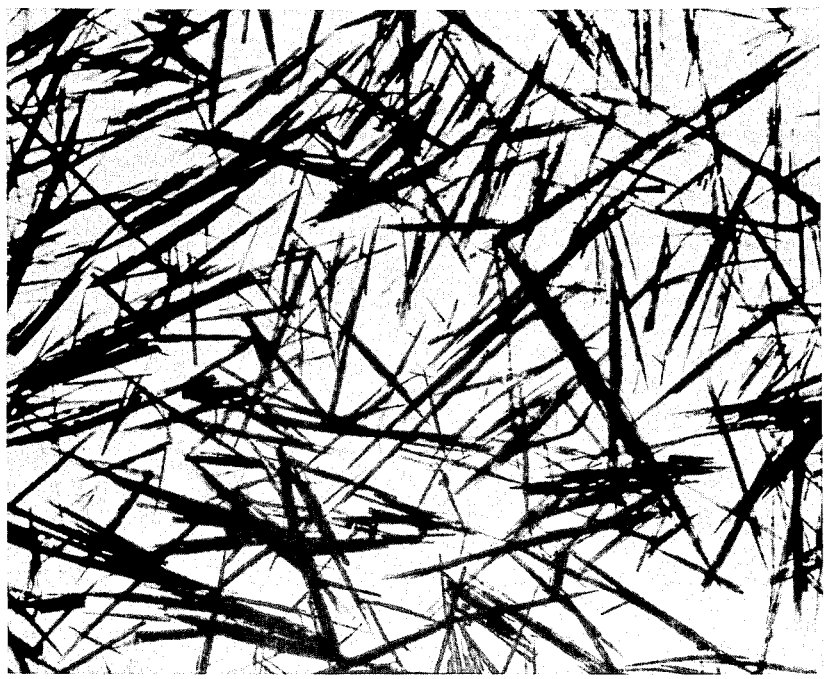
FIGS. 3 to 8 are electron microscope photographs taken at a magnification of ×20,000. Specially.

Shown in FIG. 3 is an electron microscope photographic figure (×20000) of the acicular α-FeO(OH) particles produced by the process (Example 2 detailed later) according to the present invention. As is obvious from this electron microscope photograph, the acicular α-FeO(OH) particle produced by the process according to the present invention has a higher axial ratio without ultra-micronization.

Now the conditions for carrying out the process according to the present invention will be described in detail as following.

As an aqueous Fe(II) salt solution used in the process of the present invention, an aqueous ferrous sulfate solution, an aqueous ferrous chloride solution et al. can be mentioned.

The magnesium sulfate or magnesium chloride may be added previously to the Fe(II) aqueous solution, the alkaline aqueous solution or the Fe(OH)$_2$ suspension. Anyhow, magnesium sulfate or magnesium chloride salt exhibits an effect of facilitating the growth of the particles in their long axis.

By the way, in the process according to the present invention the magnesium sulfate or magnesium chloride must be added strictly before starting the oxidation of Fe(OH)$_2$ suspension with an oxygen-containing gas. This is because the nucleation (formation of seeds) of α-FeO(OH) takes place at an early stage of the oxidation as mentioned above, and thereafter if the water-soluble magnesium salt is added after the oxidation is already started, it does not contribute to the growth of α-FeO(OH) nuclei in the direction of their long axis.

The added amount of the magnesium sulfate or magnesium chloride should be in an amount of 0.5 to 7.0 atomic % calculated as Mg/Fe(II). On the added amount is less than 0.5 atomic % calculated as Mg/Fe(II), the objects of the present invention cannot be fully achieved, while the adding of more than 7.0 atomic % calculated as Mg/Fe(II) is unfavorable because a lowering of purity of the acicular ferromagentic iron oxide particles obtained by heat treatment of the obtained α-FeO(OH) particles results in a decrease of saturation magnetization. Therefore in both cases the final product of the desired magnetic properties can hardly be obtained. In view of the axial ratio and the length of long axis of the acicular α-FeO(OH) particle obtained according to the process of the present invention, the added amount of the magnesium sulfate or magnesium chloride is preferably 1.0 to 3.0 atomic % as calculated as Mg/Fe(II).

The acicular α-FeO(OH) particles produced by the process of the present invention have the average 0.3 to 2.0 μm of the length of long axis and more than 20:1 of the axial ratio.

To obtain the acicular magnetite or acicular maghemite having superior magnetic properties by using the acicular α-FeO(OH) particles as a starting material through the reduction and re-oxidation thereof, the above-mentioned axial ratio is the critical lower limit. This is because during the reduction and re-oxidation of the acicular α-FeO(OH) particles these particles are shrinked to lower the axial ratio thereof. The axial ratio of the acicular α-FeO(OH) particle is preferably from 20:1 to 70:1.

The acicular α-FeO(OH) particles obtained according to the present invention may be reduced and optionally further re-oxidized by the conventional heating while maintaining the original particle shape of the starting acicular α-FeO(OH) particles, thereby acicular magnetite particles and acicular maghemite particles having superior properties can be produced. The heating treatment in the process of the present invention can be used under conventional method.

Now the advantages of the present invention will be summarized as followings.

According to the present invention, acicular magnetite particles and acicular maghemite particles having higher axial ratio without ultra-micronization can be easily prepared. The acicular magnetite particle or the acicular maghemite particle thus prepared has a large coercive force and therefore is suitable for the use as a magnetic material for recording of high output, high sensitivity and high density. Besides, when said acicular magnetite particle or acicular maghemite particle is used in the production of magnetic paint, they exhibit superior orientation and packing property in a coating contributing to the production of preferable magnetic recording media.

Now the present invention will be described by the examples and the comparative examples.

The length of long axis and the axial ratio (long axis:short axis) of the particles in the examples and the comparative examples were measured by the electron microscope photograph and indicated as the mean value, respectively.

PREPARATION OF ACICULAR α-FEO(OH) PARTICLES AS STARTING MATERIAL

Example 1

20.0 l of an aqueous ferrous sulfate solution containing 1.00 mol of Fe(II) per liter and having been added of 49.7 g of magnesium sulfate (MgSO$_4$.7H$_2$O) which corresponds to 1.0 atomic % based on the amount of iron (II) hydroxide and calculated as the ratio of Mg to Fe(II) was added to a 20.0 l of 4.75N-NaOH aqueous solution, whereby Fe(OH)$_2$ was formed at a pH of 13.5 and at a temperature of 45° C.

At a temperature of 45° C., air was introduced into the aqueous suspension containing the thus formed Fe(OH)$_2$ for 16.5 hour at a rate of 100 liters/min to form acicular α-FeO(OH) particles. The termination of the oxidation reaction was determined by the blue colour reaction test of Fe(II) with red prussiate solution after extracting a portion of the reaction solution and acidifying it with hydrochloric acid.

The thus formed particles were washed with water, filtered, dried and pulverized according to a conventional methods. The electron microscope photographs of the thus obtained particles showed a mean value of their long axis was 0.70 μm and an average axial ratio was 31:1 and that the particles had higher axial ratio.

Examples 2 to 8

In the same manner as described in Example 1 except that the kind of the aqueous solution of ferrous salt, the concentration of the aqueous NaOH solution, the amount of magnesium sulfate or magnesium chloride and the time of the addition thereof were varied acicular α-FeO(OH) particles were produced. The main conditions for the preparation and the properties of the particles are shown in Table 1.

The acicular α-FeO(OH) particles obtained in each example, from Example 2 to Example 8, was proved to have higher axial ratio as a result of the electron microscope photographs. FIG. 3 shows the electron microscope photograph (×20000) of the acicular α-FeO(OH) particles obtained in Example 2.

Comparative Example 1

Under the same conditions as described in Example 1, however, without the presence of magnesium sulfate, acicular α-FeO(OH) particles were produced. The main conditions for the preparation and the properties of the particles are also shown in Table 1.

Figure 4:
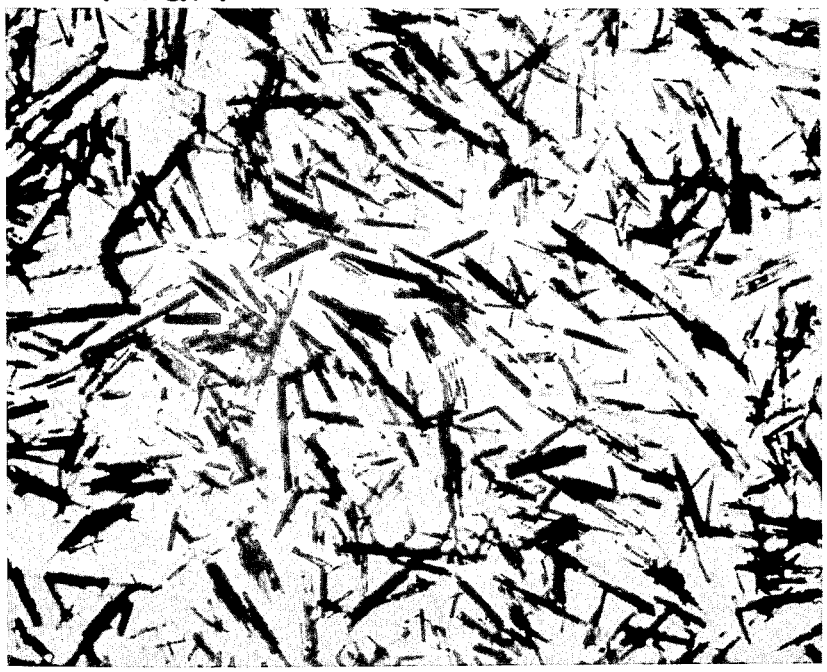

FIG. 4 is the electron microscope photograph (×20000) of the thus obtained acicular α-FeO(OH) particles. As is clearly shown in FIG. 4, the acicular α-FeO(OH) particles is of 0.50 μm in the mean value of their long axis and of 10:1 of the average axial ratio, thus unfavorable in acicular shape.

PRODUCTION OF ACICULAR MAGNETITE POWDER

Example 9

Three hundred grams of acicular α-FeO(OH) particles obtained in Example 1 was introduced into a 3-liter rotary retort with one open end, and the particles were reduced by introducing H$_2$ gas into the retort at a rate of 3 liters/min at a temperature of 400° C. while rotating the retort to obtain 260 g of acicular magnetite particles. The observation of electron microscope photograph showed that the particle shape of the acicular α-FeO(OH) particles which were the starting material has been maintained in the obtained acicular magnetite particles and that the mean value of the long axis was 0.58 μm and the average axial ratio was 23:1, thus their particles had higher axial ratio.

Measurement of magnetic properties showed that the coercive force Hc was 473 Oe, and the saturation magnetization $\sigma_s$ was 84.1 emu/g.

Examples 10 to 16

In the same manner as described in Example 9 except that the kinds of the starting material were varied, acicular magnetite particles were produced. Table 2 shows the main conditions for the preparation and the properties of the particles.

The electron microscope photographs showed that those acicular magnetite particles obtained in Examples 10 to 16 had higher axial ratio.

Figure 5:

Those acicular magnetite particles obtained in Examples 10 to 16 were favorable in the acicular shape. FIG. 5 shows the electron microscope photograph (×20000) of the acicular magnetite particles obtained in Example 10.

Comparative Example 2

Figure 6:

The acicular α-FeO(OH) particles obtained in Comparative Example 1 were converted into the acicular magnetite particles in the same manner as in Example 9. FIG. 6 shows the electron microscope photograph of the thus obtained acicular magnetite particles. As is clearly seen in FIG. 6, the mean value of their long axis and the average axial ratio of the acicular magnetite particles were 0.31 μm and 6:1, respectively, the acicular shape being not favorable.

PRODUCTION OF ACICULAR MAGHEMITE PARTICLES

Example 17

120 g of acicular magnetite particles obtained in Example 9 was oxidized at 270° C. in air for 90 minutes to give acicular maghemite particles. The thus obtained acicular maghemite particles had the mean value of their long axis of 0.58 μm and an average axial ratio of 23:1, thus illustrating favorable needles according to the observation of their electron microscope photograph. Magnetic measurement showed their coercive force Hc was 437 Oe and their saturation magnetization $\sigma_s$ was 73.2 emu/g.

Examples 18 to 24

Figure 7:
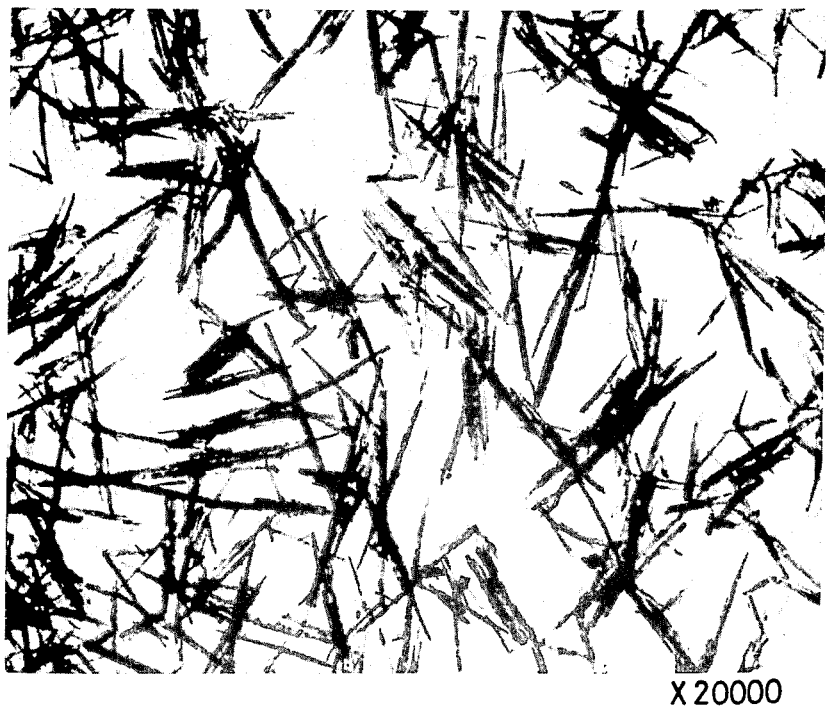

Acicular magnetite particles obtained in Examples 10 to 16 were respectively converted to acicular maghemite particles in the same manner as described in Example 17, the properties of these particles being shown in Table 3. All of them had higher axial ratio. FIG. 7 shows the electron microscope photograph (×20000) of acicular maghemite particles obtained in Example 18.

Comparative Example 3

Figure 8:
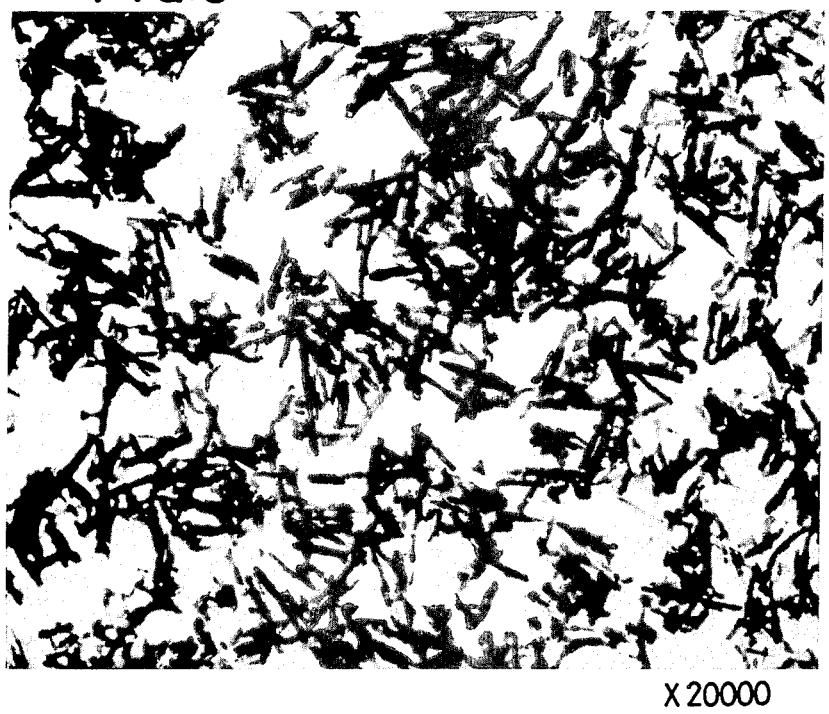

Acicular magnetite particles obtained in Comparative Example 2 were converted to acicular maghemite particles in the same manner as described in Example 17, and its electron microscope photograph (×20000) is shown in FIG. 8. As is seen in FIG. 8, the mean value of the long axis and the average axial ratio of the acicular maghemite particles obtained in Comparative Example 3 were, respectively, 0.31 μm and 6:1 showing the poor acicular shape.

PRODUCTION OF MAGNETIC TAPE

Example 25

The acicular magnetite particles obtained in Example 9 and binders composed as mentioned below were introduced into a ball mill and mixed to disperse therein for 8 hours to produce magnetic paint.

| | |
|---|---|
| Acicular magnetite particles | 100 g |
| Vinyl resin (vinyl acetate:vinyl chloride = 3:91 copolymer) | 20 g |
| Nitrile rubber (acrylonitrile copolymer) | 100 g |
| Toluene | 100 g |
| Methyl ethyl ketone | 75 g |
| Methyl isobutyl ketone | 75 g |
| Lecithin (a dispersing agent) | 0.2 g |

To the thus prepared magnetic paint, a solvent (toluene:methyl ethyl ketone:methyl isobutyl ketone=1:1:1) was added to adjust a viscosity. Thereafter, applying the paint on a polyester resin film by a conventional method, a magnetic tape was prepared. The thus prepared magnetic tape showed a coercive force Hc of 431 Oe and a residual magnetic flux Br of 1420 Gauss, a rectanglar ratio Br/Bm of 0.86 and an orientation ratio of 3.2.

Examples 26 to 40 and Comparative Examples 4 and 5

In the same manner as described in Example 25, magnetic tapes were prepared, except that the kind of acicular magnetic iron oxide particles was varied.

Properties of the thus prepared magnetic tapes are shown in Table 4.

TABLE 1

| | | Production of acicular α-FeO(OH) particles | | | | | | | Acicular α-FeO(OH) particles Properties of particles | |
|---|---|---|---|---|---|---|---|---|---|---|
| Examples and Comparative Example | Aqueous Fe(II) solution | | Aqueous NaOH solution | | Water-soluble Mg salt | | | Reaction time (hour) | | |
| | Kind | Concentration (mol/l) | Added amount (l) | Concentration (N) | Added amount (l) | Kind | Added amount of Mg (atomic %) | Time of the addition* | | Long axis (μm) | Axial ratio (long axis:short axis) |
| Example 1 | FeSO$_4$ | 1.00 | 20.0 | 4.75 | 20.0 | MgSO$_4$.7H$_2$O | 1.0 | A | 16.5 | 0.70 | 31:1 |
| 2 | " | " | " | 4.80 | " | " | 2.0 | " | 18.2 | 0.90 | 58:1 |
| 3 | " | " | " | " | " | " | 3.0 | " | 22.1 | 0.88 | 62:1 |
| 4 | " | " | " | 4.85 | " | " | 4.5 | " | 18.4 | 0.81 | 61:1 |
| 5 | " | " | " | " | " | " | 6.0 | " | 16.3 | 0.77 | 63:1 |
| 6 | FeCl$_2$ | " | " | 4.80 | " | MgCl$_2$.6H$_2$O | 2.0 | " | 18.1 | 0.91 | 57:1 |

TABLE 1-continued

<table>
<tr><th rowspan="3">Examples and Comparative Example</th><th colspan="2">Aqueous Fe(II) solution</th><th colspan="2">Aqueous NaOH solution</th><th colspan="3">Water-soluble Mg salt</th><th rowspan="2">Reaction time (hour)</th><th colspan="2">Acicular α-FeO(OH) particles Properties of particles</th></tr>
<tr><th></th><th></th><th></th><th></th><th></th><th>Added amount of Mg</th><th>Time of the addi-</th><th>Long axis</th><th>Axial ratio (long</th></tr>
<tr><th>Kind</th><th>Concentration (mol/l)</th><th>Added amount (1)</th><th>Concentration (N)</th><th>Added amount (1)</th><th>Kind</th><th>(atomic %)</th><th>tion*</th><th>(μm)</th><th>axis:short axis)</th></tr>
<tr><td>7</td><td>FeSO₄</td><td>"</td><td>"</td><td>"</td><td>"</td><td>MgSO₄.7H₂O</td><td>"</td><td>B</td><td>17.9</td><td>0.89</td><td>56:1</td></tr>
<tr><td>8</td><td>"</td><td>"</td><td>"</td><td>"</td><td>"</td><td>"</td><td>"</td><td>C</td><td>18.1</td><td>0.91</td><td>57:1</td></tr>
<tr><td>Comparative Example 1</td><td>FeSO₄</td><td>1.00</td><td>20.0</td><td>4.70</td><td>20.0</td><td>—</td><td>—</td><td>—</td><td>13.9</td><td>0.50</td><td>10:1</td></tr>
</table>

*A: Water-soluble Mg salt was added to an aqueous Fe(II) solution.
B: Water-soluble Mg salt was added to an alkaline aqueous solution.
C: Water-soluble Mg salt was added to an aqueous suspension of Fe(OH)₂.

TABLE 2

<table>
<tr><th rowspan="3">Examples and Comparative Example</th><th rowspan="3">Kind of starting material (Example No. and Comparative Example No.</th><th rowspan="3">Reduction Temperature (°C.)</th><th colspan="4">Production of acicular magnetite particles</th></tr>
<tr><th colspan="2">Properties of particles</th><th colspan="2">Magnetic properties</th></tr>
<tr><th>Long axis (μm)</th><th>Axial ratio (long axis: short axis)</th><th>Saturation magnetization ($\sigma_s$) (emu/g)</th><th>Coercive force (Hc) (Oe)</th></tr>
<tr><td>Example 9</td><td>Example 1</td><td>400</td><td>0.58</td><td>23:1</td><td>84.1</td><td>473</td></tr>
<tr><td>10</td><td>2</td><td>"</td><td>0.75</td><td>35:1</td><td>83.3</td><td>481</td></tr>
<tr><td>11</td><td>3</td><td>"</td><td>0.73</td><td>31:1</td><td>82.4</td><td>478</td></tr>
<tr><td>12</td><td>4</td><td>"</td><td>0.68</td><td>28:1</td><td>81.5</td><td>476</td></tr>
<tr><td>13</td><td>5</td><td>"</td><td>0.62</td><td>23:1</td><td>80.8</td><td>471</td></tr>
<tr><td>14</td><td>6</td><td>"</td><td>0.75</td><td>35:1</td><td>83.1</td><td>479</td></tr>
<tr><td>15</td><td>7</td><td>"</td><td>0.74</td><td>34:1</td><td>83.0</td><td>480</td></tr>
<tr><td>16</td><td>8</td><td>"</td><td>0.75</td><td>35:1</td><td>83.2</td><td>481</td></tr>
<tr><td>Comparative Example 2</td><td>Comparative Example 1</td><td>350</td><td>0.31</td><td>6:1</td><td>86.7</td><td>399</td></tr>
</table>

TABLE 3

<table>
<tr><th rowspan="3">Examples and Comparative Example</th><th rowspan="3">Kind of acicular magnetite particles (Example No. and Comparative Example No.)</th><th colspan="4">Production of acicular maghemite particles</th></tr>
<tr><th colspan="2">Properties of particles</th><th colspan="2">Magnetic properties</th></tr>
<tr><th>Long axis (μm)</th><th>Axial ratio (long axis: short axis)</th><th>Saturation magnetization ($\sigma_s$) (emu/g)</th><th>Coercive force (Hc) (Oe)</th></tr>
<tr><td>Example 17</td><td>Example 9</td><td>0.58</td><td>23:1</td><td>73.2</td><td>437</td></tr>
<tr><td>18</td><td>10</td><td>0.75</td><td>35:1</td><td>72.3</td><td>448</td></tr>
<tr><td>19</td><td>11</td><td>0.73</td><td>31:1</td><td>71.3</td><td>442</td></tr>
<tr><td>20</td><td>12</td><td>0.68</td><td>28:1</td><td>70.2</td><td>440</td></tr>
<tr><td>21</td><td>13</td><td>0.62</td><td>23:1</td><td>69.4</td><td>430</td></tr>
<tr><td>22</td><td>14</td><td>0.75</td><td>35:1</td><td>71.8</td><td>448</td></tr>
<tr><td>23</td><td>15</td><td>0.74</td><td>34:1</td><td>72.1</td><td>447</td></tr>
<tr><td>24</td><td>16</td><td>0.75</td><td>35:1</td><td>72.3</td><td>445</td></tr>
<tr><td>Comparative Example 3</td><td>Comparative Example 2</td><td>0.31</td><td>6:1</td><td>74.8</td><td>351</td></tr>
</table>

TABLE 4

<table>
<tr><th rowspan="2">Examples and Comparative Examples</th><th rowspan="2">Kind of magnetic particles (Example No. and Comparative Example No.)</th><th colspan="4">Properties of Tape</th></tr>
<tr><th>Coercive force (Hc) (Oe)</th><th>Residual magnetic flux (Br) (Gauss)</th><th>Rectangular (Br/Bm)</th><th>Orientation ratio (Br/Bm) ∥ / (Br/Bm) ⊥</th></tr>
<tr><td>Example 25</td><td>Example 9</td><td>431</td><td>1420</td><td>0.86</td><td>3.2</td></tr>
</table>

TABLE 4-continued

| Examples and Comparative Examples | Kind of magnetic particles (Example No. and Comparative Example No.) | Properties of Tape | | | |
|---|---|---|---|---|---|
| | | Coercive force (Hc) (Oe) | Residual magnetic flux (Br) (Gauss) | Rectangular (Br/Bm) | Orientation ratio (Br/Bm)∥ / (Br/Bm)⊥ |
| 26 | 10 | 443 | 1417 | 0.90 | 3.6 |
| 27 | 11 | 438 | 1410 | 0.88 | 3.4 |
| 28 | 12 | 435 | 1408 | 0.87 | 3.2 |
| 29 | 13 | 430 | 1405 | 0.85 | 3.1 |
| 30 | 14 | 440 | 1415 | 0.90 | 3.6 |
| 31 | 15 | 441 | 1415 | 0.90 | 3.6 |
| 32 | 16 | 440 | 1416 | 0.89 | 3.5 |
| 33 | 17 | 401 | 1448 | 0.88 | 3.5 |
| 34 | 18 | 410 | 1452 | 0.92 | 3.8 |
| 35 | 19 | 403 | 1449 | 0.90 | 3.7 |
| 36 | 20 | 401 | 1441 | 0.89 | 3.5 |
| 37 | 21 | 390 | 1436 | 0.88 | 3.5 |
| 38 | 22 | 408 | 1450 | 0.91 | 3.7 |
| 39 | 23 | 410 | 1448 | 0.92 | 3.8 |
| 40 | 24 | 409 | 1451 | 0.91 | 3.7 |
| Comparative Example 4 | Comparative Example 2 | 321 | 1120 | 0.78 | 1.9 |
| 5 | 3 | 290 | 1090 | 0.79 | 1.9 |

What is claimed is:

1. A process for preparing acicular magnetite of high axial ratio, which comprises
   (a) providing a suspension of iron (II) hydroxide in aqueous sodium hydroxide at a pH of at least 11 and containing 0.5 to 7.0 atom % magnesium based on the amount of the iron (II) hydroxide in the suspension and calculated as the ratio of Mg to Fe(II), said magnesium being provided as its sulfate or chloride;
   (b) oxidizing said suspension with an oxygen-containing gas to form acicular iron (III) oxide hydroxide in the form of particles having a long axis length of 0.3 to 2.0 μm and an axial ratio of more than 20:1, said acicular iron (III) oxide hydroxide exhibiting a higher axial ratio than acicular iron (III) oxide hydroxide prepared as above absent said magnesium sulfate or magnesium chloride; and
   (c) reducing said acicular iron (III) oxide hydroxide to acicular magnetite having the same particle shape.

2. A process according to claim 1, wherein the acicular magnetite so prepared is further oxidized to acicular maghemite having the same particle shape.

3. The process of claim 1 or 2, wherein the amount of magnesium present is between 1.0 to 3.0 atom %.

* * * * *